(12) United States Patent
Shibata et al.

(10) Patent No.: US 11,493,162 B2
(45) Date of Patent: Nov. 8, 2022

(54) JOINT AND FLUID CONTROL DEVICE

(71) Applicant: FUJIKIN INCORPORATED, Osaka (JP)

(72) Inventors: Yusuke Shibata, Osaka (JP); Kazuhiro Fujine, Osaka (JP); Hidehiro Doya, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 561 days.

(21) Appl. No.: 16/560,301

(22) Filed: Sep. 4, 2019

(65) Prior Publication Data

US 2019/0390811 A1 Dec. 26, 2019

Related U.S. Application Data

(63) Continuation of application No. PCT/JP2018/008452, filed on Mar. 6, 2018.

(30) Foreign Application Priority Data

Mar. 15, 2017 (JP) .............................. JP2017-050482

(51) Int. Cl.
*F16L 41/03* (2006.01)
*F16L 41/02* (2006.01)
*F16K 27/00* (2006.01)

(52) U.S. Cl.
CPC .......... *F16L 41/025* (2013.01); *F16K 27/003* (2013.01); *F16L 41/03* (2013.01)

(58) Field of Classification Search
CPC ........ F16L 41/025; F16L 47/28; F16K 11/105
See application file for complete search history.

(56) References Cited

U.S. PATENT DOCUMENTS 5,178,191 A 1/1993 Schaefer
6,125,887 A 10/2000 Pinto
(Continued)

FOREIGN PATENT DOCUMENTS

CN 103732972 A 4/2014
JP H09184599 A 7/1997
(Continued)

OTHER PUBLICATIONS

CNIPA Second Office Action for corresponding CN Application No. 201880009293.6; dated Dec. 17, 2020.
(Continued)

*Primary Examiner* — Zachary T Dragicevich
*Assistant Examiner* — James A Linford
(74) *Attorney, Agent, or Firm* — Cantor Colburn LLP

(57) ABSTRACT

A joint includes a first block, a second block, and a single pipe section connecting the first block and the second block. The first block, the second block, and the single pipe have a first gas passage and a second gas passage inside therein. The first gas passage is formed so that a first port which opens at an outer surface of the first block, the single pipe section, and a second port which opens at an outer surface of the second block communicate with each other. The second gas passage is formed so that a third port and a fourth port which open at the outer surface of the second block communicate with each other. The second port is disposed between the third port and the fourth port.

8 Claims, 3 Drawing Sheets

(56) References Cited

U.S. PATENT DOCUMENTS

| | | | |
|---|---|---|---|
| 6,209,571 B1 | 4/2001 | Itoh et al. | |
| 2002/0185185 A1 | 12/2002 | Yamaji et al. | |
| 2003/0155024 A1* | 8/2003 | Hanada | F16K 27/003 137/861 |
| 2005/0224121 A1* | 10/2005 | Milburn | F16K 27/003 137/884 |
| 2007/0295414 A1* | 12/2007 | Shinohara | F16K 27/003 137/561 A |
| 2008/0295963 A1* | 12/2008 | Moriya | C23C 16/4404 118/712 |
| 2009/0095354 A1* | 4/2009 | Taskar | F16L 41/03 137/15.01 |
| 2009/0183792 A1* | 7/2009 | Tokuda | F16K 27/003 137/798 |
| 2015/0000773 A1 | 1/2015 | Yogo et al. | |
| 2015/0152969 A1 | 6/2015 | Yogo et al. | |
| 2016/0061704 A1* | 3/2016 | Deguchi | G01N 21/59 250/573 |
| 2021/0125842 A1* | 4/2021 | Iwasawa | H01L 21/67017 |

FOREIGN PATENT DOCUMENTS

| | | |
|---|---|---|
| JP | H10311451 A | 11/1998 |
| JP | 2000240900 A | 9/2000 |
| JP | 2002349797 A | 12/2002 |
| JP | 2005-163952 A | 6/2005 |
| JP | 2005163952 A | 6/2005 |
| JP | 2008-012405 A | 1/2008 |
| JP | 2008012405 A | 1/2008 |
| JP | 2008210982 A | 9/2008 |
| JP | 2013-177948 A | 9/2013 |
| JP | 2013177948 A | 9/2013 |
| JP | 2015-010623 A | 1/2015 |
| JP | 2015010623 A | 1/2015 |
| WO | 2008004501 A1 | 1/2008 |

OTHER PUBLICATIONS

IPOS Office Action corresponding to SG application No. 11201907543X; dated Jan. 22, 2021.
IPOS Office Action corresponding to Singapore Patent Application No. 11201907543X dated Apr. 7, 2020.
May 29, 2018 International Search Report issued in International Patent Application No. PCT/JP2018/008452.
CNIPA Office Action for corresponding CN Application No. 201880009293.6 dated May 21, 2020.

* cited by examiner

JOINT AND FLUID CONTROL DEVICE

CROSS REFERENCE TO RELATED APPLICATION

This application is a continuation application of International Application No. PCT/JP2018/008452, filed Mar. 3, 2018, which claims priority to Japanese Patent Application No. 2017-050482, filed Mar. 15, 2017. The contents of these applications are incorporated herein by reference in their entirety.

TECHNICAL FIELD

The present disclosure relates to a joint for a fluid control device used in a semiconductor manufacturing device or the like and a fluid control device including the joint.

BACKGROUND

Conventionally, a joint for fluid control devices have been proposed in Japanese Patent Application Publication No. 2005-163952. In the joint disclosed in Japanese Patent Application Publication No. 2005-163952 on which a mass flow controller is installed, first to fourth ports are formed in a straight line on the top surface of the joint having a block shape, the first and the third ports being connected to each other by a V-shaped passage, the second and the fourth ports being connected to each other by a V-shaped passage. The joint is configured so that the central port of a three-way valve device communicates with another port on the side of the top surface of the block, and that a purge gas branch pipe spreading across a plurality of gas lines is subsequently attached to the side of the top surface of the block, whereby it becomes possible to separately assemble the plurality of gas lines in advance.

SUMMARY

In the joint disclosed in Japanese Patent Application Publication No. 2005-163952, however, the top surface of the single block includes the four ports. Therefore, it is not easy to change the size of the joint according to a change in the size of the mass flow controller at the time of modifying a gas line of a fluid control device. That is, in order to change the distances between the ports, the angles of the passages are required to be changed, and the two V-shaped passages are required to be redesigned.

In view of the above problems, it is an object of the present disclosure to provide a joint and a fluid control device that can be easily changed in size when modifying a gas line or the like.

In order to address the above object, a joint according to an aspect of the present disclosure includes a first block, a second block, and a single pipe section connecting the first block and the second block. The first block, the second block, and the single pipe have a first gas passage and a second gas passage inside therein. The first gas passage is formed so that a first port which opens at an outer surface of the first block, the single pipe section, and a second port which opens at an outer surface of the second block communicate with each other. The second gas passage is formed so that a third port and a fourth port which opens at the outer surface of the second block communicate with each other. The second port is disposed between the third port and the fourth port.

A fluid control device according to an aspect of the present disclosure includes a plurality of gas lines, each of the gas lines including a plurality of fluid control apparatuses and joints on which the fluid control apparatuses are installed. The joint includes a first block, a second block, and a single pipe section connecting the first block and the second block, and has a first gas passage and a second gas passage inside the joint. The first gas passage is formed so that a first port which opens at an outer surface of the first block, the single pipe section, and a second port which opens at an outer surface of the second block communicate with each other. The second gas passage is formed so that a third port and a fourth port which open at the outer surface of the second block communicate with each other. The second port is disposed between the third port and the fourth port.

DETAILED DESCRIPTION

A joint and a fluid control device according to a first embodiment of the present disclosure will be described with reference to the drawings.

Figure 1:
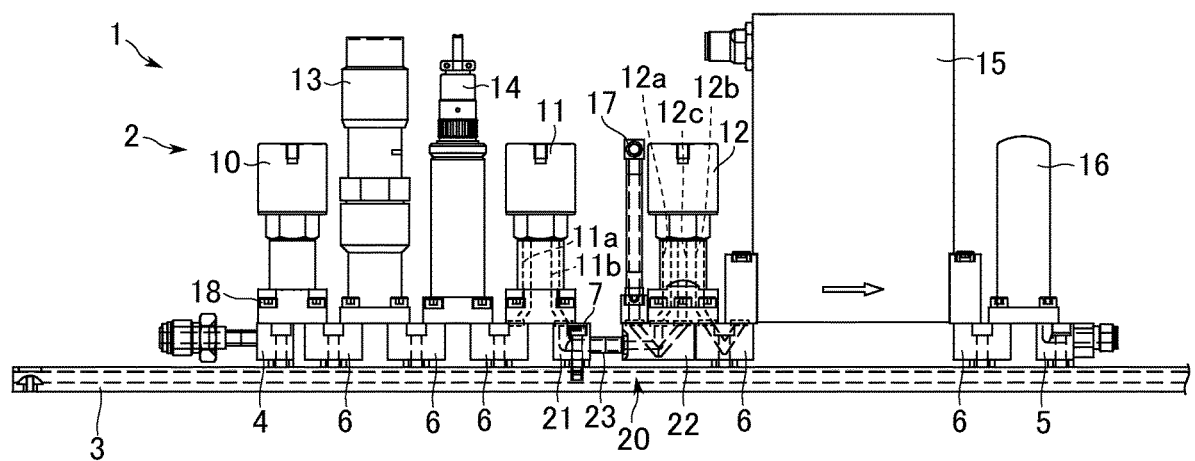
FIG. 1 shows a schematic view of a fluid control device including a joint according to the present embodiment.

FIG. 1 shows a schematic view of a fluid control device 1 including a joint 20 according to the present embodiment.

The fluid control device 1 includes a plurality of gas lines 2, a plurality of rails 3, and a base not shown to which the rails 3 are fixed. Note that FIG. 1 shows only one of the plurality of gas lines 2 and one of the plurality of rails 3.

The gas line 2 includes a plurality of joints 4 to 6 and 20, a plurality of fluid control apparatuses 10 to 16, and a purge gas branch pipe 17.

The plurality of joints 4 to 6 and 20 include an inlet joint 4 serving as an inlet for process gas, an outlet joint 5 serving as an outlet for the process gas, and a plurality of block-shaped joints 6 and 20 arranged between the inlet joint 4 and the outlet joint 5. The joint 20 will be described in detail later. The plurality of joints 4 to 6 are fixed to the rail 3 by bolts not shown. The respective joints 4 to 6 are formed to have gas passages not shown, and the passages communicate with the corresponding fluid control apparatus 10 to 16.

The plurality of fluid control apparatus 10 to 16 include valve devices 10 to 12 (a valve device 11 being a first valve device 11, a valve device 12 being a second valve device 12) which are automatic valve devices (for example, fluid driving automatic valve devices), a manual regulator (pressure reducing valve device) 13, a pressure gauge 14, a flow rate control apparatus (for example, MFC (Mass Flow Controller)) 15, and a filter 16. The respective fluid control apparatuses 10 to 16 are coupled to the joints 4 to 6 and 20 by bolts 18 (reference sign is added to only one of the bolts 18 for the simplification of the figure).

The first valve device 11 is formed to have a first gas inflow passage 11a and a first gas outflow passage 11b. The second valve device 12 is a three-way valve device, and formed to have a second gas inflow passage 12a, a second gas outflow passage 12b, and a purge gas passage 12c.

The purge gas branch pipe 17 has one end thereof connected to the joint 20 and the other end thereof connected to a purge gas main pipe not shown.

Then, process gas flowing in from the inlet joint 4 is supplied to a chamber not shown via the fluid control apparatuses 10 to 16, the plurality of joints 6 and 20, and the outlet joint 5. Further, purge gas (for example, nitrogen) supplied from the purge gas main pipe not shown flows in the purge gas branch pipe 17, and then flows to the side of the inlet joint 4 from the second gas inflow passage 12a and the side of the outlet joint 5 from the second gas outflow passage 12b via the purge gas passage 12c of the second valve device 12.

Next, the joint 20 according to the present embodiment will be described with reference to FIG. 1 to FIG. 3.

Figure 2:
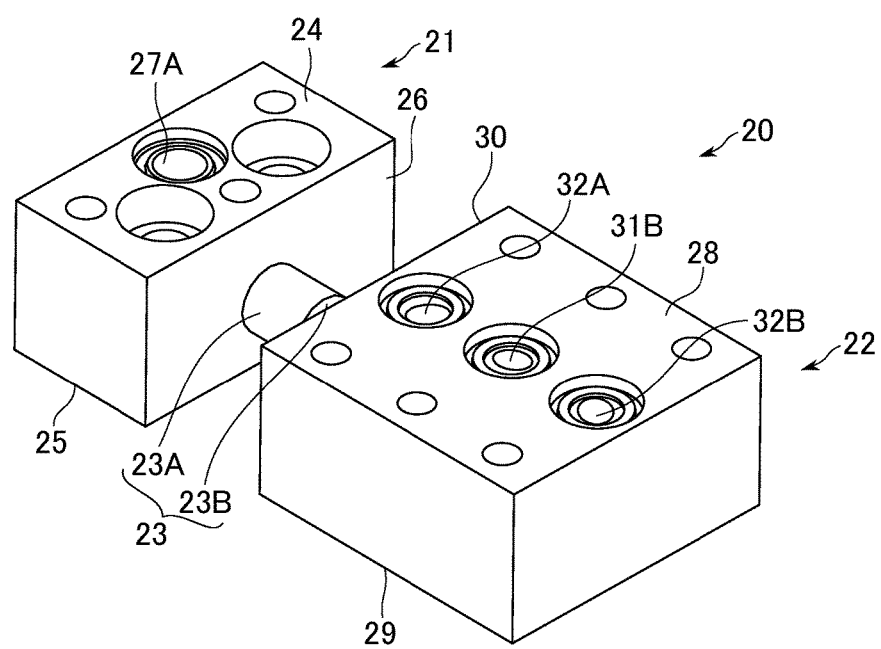
FIG. 2 shows a perspective view of the joint according to the embodiment of the present disclosure.
Figure 3A:
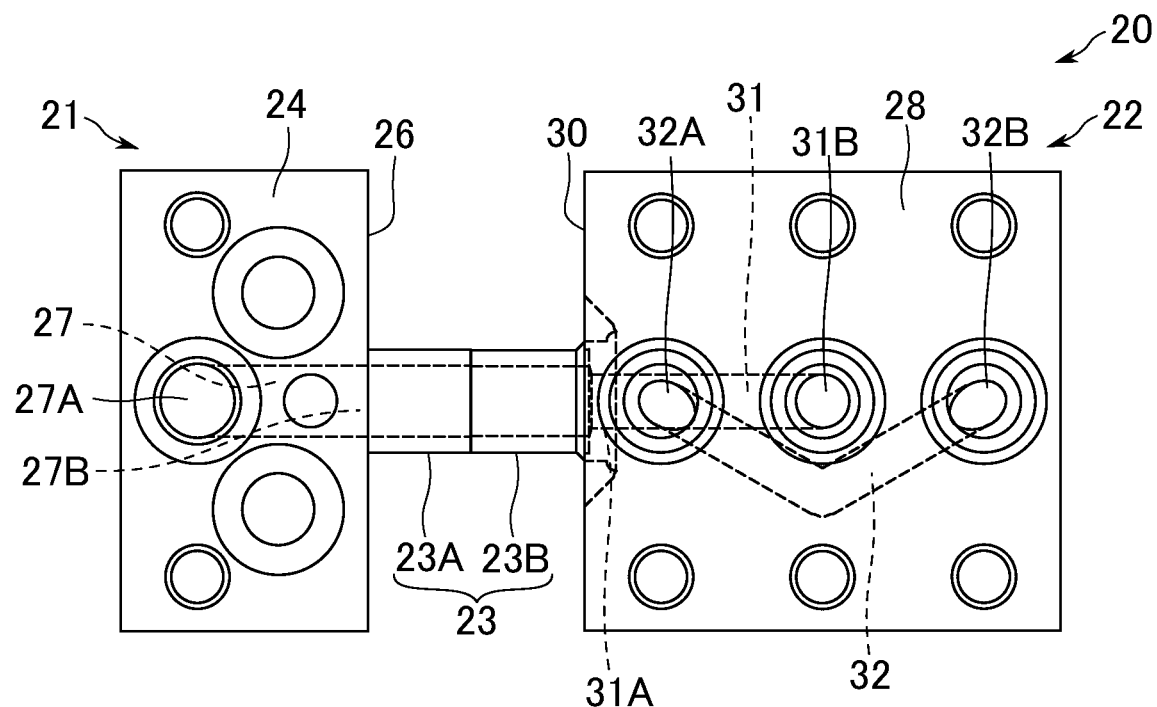
FIGS. 3A and 3B show a plan view of the joint and a side view of the joint, respectively.
Figure 3B:
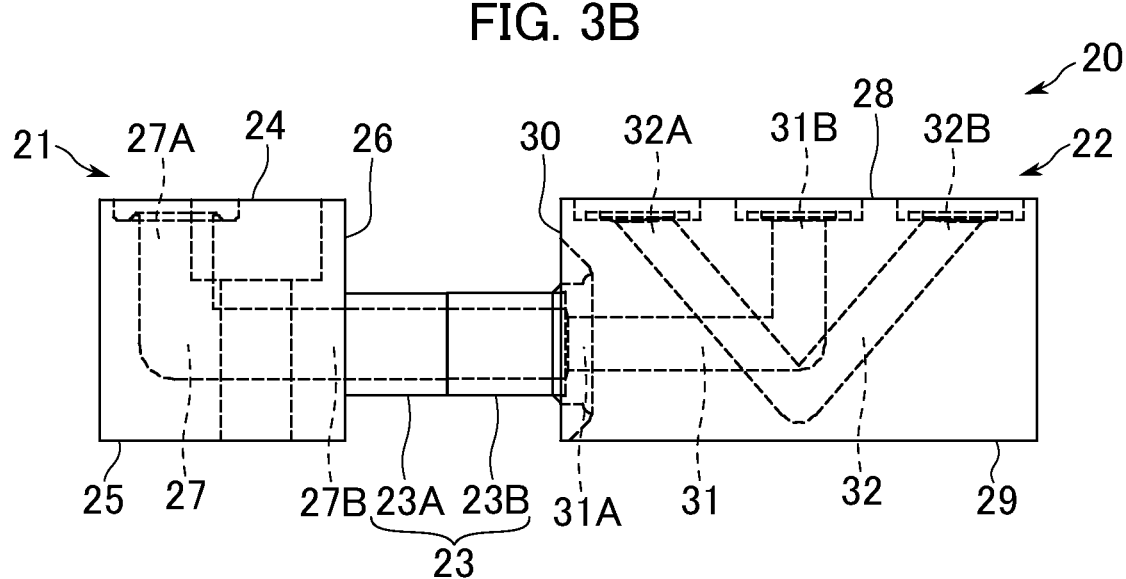

FIG. 2 shows a perspective view of the joint 20. FIG. 3A shows a plan view of the joint 20, and FIG. 3B shows a side view of the joint 20.

The joint 20 includes a first block 21, a second block 22, and a single pipe section 23.

The first block 21 is manufactured by cutting, forging, casting, or 3D printing, and has a substantially cuboid shape. The first block 21 has a first surface 24, a second surface 25 disposed on a side opposite to the first surface 24, and a third surface 26 connecting the first surface 24 and the second surface 25. The first valve device 11 is arranged on the first surface 24. The first block 21 is fixed to the rail 3 by a bolt 7.

The first block 21 is formed to have a first passage 27. The first passage 27 forms a linear shape in plan view and a substantially L-shape in side view, and has a first inlet part 27A open at the first surface 24 and a first outlet part 27B open at the third surface 26. The first inlet part 27A communicates with the first gas outflow passage 11b of the first valve device 11.

The second block 22 is manufactured by cutting, forging, casting, or 3D printing, and has a substantially cuboid shape. The second block 22 has a fourth surface 28, a fifth surface 29 disposed on a side opposite to the fourth surface 28, and a sixth surface 30 connecting the fourth surface 28 and the fifth surface 29. The purge gas branch pipe 17 and the second valve device 12 are arranged on the fourth surface 28. The sixth surface 30 faces the third surface 26 of the first block 21.

The second block 22 is formed to have a second passage 31 and a third passage 32. The second passage 31 forms a linear shape in plan view and a substantially L-shape in side view, and has a second inlet part 31A open at the sixth surface 30 and a second outlet part 31B open at the fourth surface 28. That is, the second passage 31 includes a passage formed to be orthogonal to the fourth surface 28 and the sixth surface 30. The second inlet part 31A communicates with the single pipe section 23, and the second outlet part 31B communicates with the second gas inflow passage 12a of the second valve device 12.

The third passage 32 forms a V-shape in plan view and side view, and has a third inlet part 32A and a third outlet part 32B open at the fourth surface 28. That is, the third passage 32 is formed to be inclined with respect to the fourth surface 28 to form a substantially V-shape. The third inlet part 32A communicates with the purge gas branch pipe 17, and the third outlet part 32B communicates with the purge gas passage 12c of the second valve device 12.

The second outlet part 31B, the third inlet part 32A, and the third outlet part 32B are formed to be arranged in a straight line, and the second outlet part 31B is disposed between the third inlet part 32A and the third outlet part 32B.

The third passage 32 forms a substantially V-shape in plan view and side view, and is configured to keep out of the second passage 31 for avoiding intersection.

The single pipe section 23 is provided between the first block 21 and the second block 22, and has a first single pipe 23A and a second single pipe 23B. In the present embodiment, the first single pipe 23A is integrated with the first block 21, formed by machining, and communicates with the first outlet part 27B. The second single pipe 23B is connected to the second inlet part 31A of the second block 22 by welding. Further, the first single pipe 23A and the second single pipe 23B are connected to each other by welding. Further, if the single pipe section is welded with a single pipe having any length added to the place between the first single pipe 23A and the second single pipe 23B at the time of welding the single pipe section, the distance between the first block 21 and the second block 22 can be easily adjusted.

Note that the first inlet part 27A corresponds to a first port, the second outlet part 31B corresponds to a second port, the third inlet part 32A corresponds to a third port, the third outlet part 32B corresponds to a fourth port, the first passage 27, the single pipe section 23, and the second passage 31 correspond to a first gas passage, and the third passage 32 corresponds to a second gas passage.

According to the above joint 20, the second valve device 12 which is a three-way valve device and the purge gas branch pipe 17 are installable on the second block 22. Even in a case in which the positions of the purge gas branch pipe 17 and the second valve device 12 are required to be adjusted with a change in the size of the flow rate control apparatus 15 at the time of modifying the existing gas line 2, the positions can be easily adjusted in such a manner that the length of the single pipe section 23 is changed, whereby the gas line 2 can be modified.

Further, the second passage 31 includes the passage formed to be orthogonal to the fourth surface 28 and the sixth surface 30, and the third passage 32 is inclined with respect to the fourth surface 28 to form the substantially V-shape to keep out of the second passage 31. According to such a configuration, the third passage 32 is only required to be processed in a direction inclined with respect to the surface constituting the second block 22. Therefore, the second single pipe 23B can be formed by cutting, and the second block 22 can be easily manufactured.

Note that the present disclosure is not limited to the embodiment described above. Persons skilled in the art could perform various additions, modifications, or the like within the scope of the present disclosure.

Figure 4:
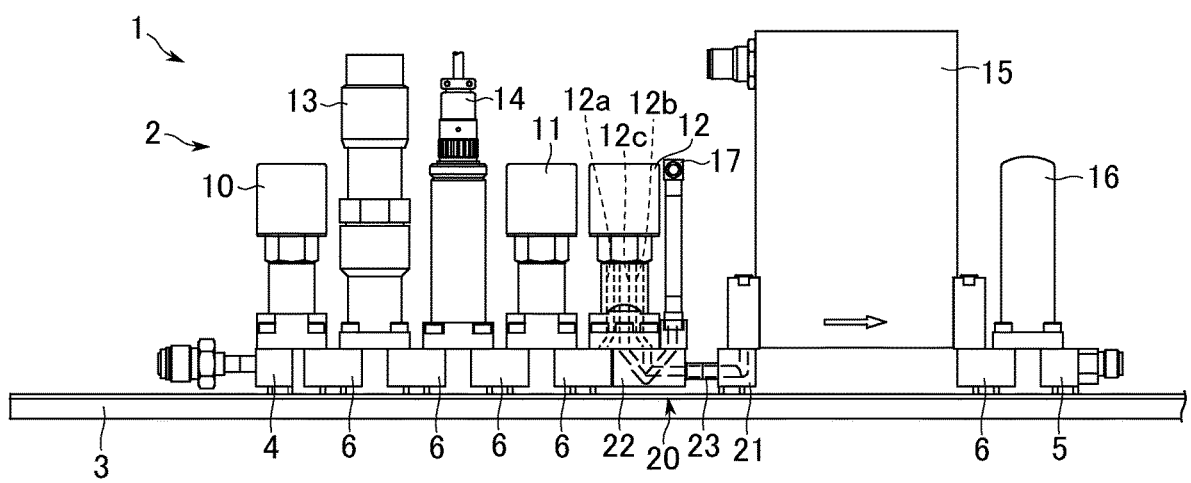
FIG. 4 shows a schematic view of the fluid control device including a joint according to a modified example.

For example, when it is desired that the space between the mass flow controller 15 and the second valve device 12 be secured, the joint 20 may be inverted by 180° from the state of the above embodiment to be installed in the fluid control device 1 as shown in FIG. 4. In this case, the second block 22 is disposed on the upstream side of the first block 21, the second valve device 12 and the purge gas branch pipe 17 are installed on the second block 22, and the flow rate control apparatus 15 is installed on the first block 21.

Such a configuration is effective at changing the purge gas of a certain gas line 2 from the purge gas of another gas line 2 because a purge gas branch pipe 17 of the certain gas line 2 can be deviated from a purge gas branch pipe 17 of the other gas line 2.

Further, the shape of the third passage 32 is the substantially V-shape but may be a substantially U-shape.

The single pipe section 23 includes the first single pipe 23A formed by machining and the second single pipe 23B bonded to the second block 22 by welding. However, the single pipe section 23 may include a single pipe bonded to the first block 21 and the second block 22 by welding, the second single pipe 23B may be formed by machining, or the first single pipe 23A may be bonded to the first block 21 by welding.

In the above embodiment, the fluid control device 1 includes the opening/closing valve devices (valve devices), the regulator, the pressure gauge, and the mass flow controller as the fluid control apparatus. Besides, the fluid control device 1 may include a filter, a non-return valve device, or the like.

What is claimed is:

1. A joint comprising:
   a first block;
   a second block; and
   a single pipe section connecting the first block and the second block, wherein
   the first block, the second block, and the single pipe has a first gas passage and a second gas passage inside therein,
   the first gas passage is formed so that a first port which opens at an outer surface of the first block, the single pipe section, and a second port which opens at an outer surface of the second block communicate with each other,
   the second gas passage is formed so that a third port and a fourth port which open at the outer surface of the second block communicate with each other,
   the second port is disposed between the third port and the fourth port,
   the first gas passage includes a first passage formed on the first block and a second passage formed on the second block,
   the first passage includes the first port and an another port, the another port of the first passage opening at an another outer surface of the first block orthogonal to the outer surface at which the first port opens, the another port of the first passage being connected to the single pipe,
   the second passage includes the second port and an another port, the another port of the second passage opening at an another outer surface of the second block orthogonal to the outer surface at which the second port opens, the another port of the second passage being connected to the single pipe, and
   the outer surface of the first block and the outer surface of the second block face a same side, and the first port and the second port open on a same side.

2. The joint according to claim 1, wherein
   the first gas passage has a first passage formed in the first block and a second passage formed in the second block,
   the second passage includes a passage formed to be orthogonal to the outer surface of the second block, and
   the second gas passage is formed to keep out of the second passage.

3. The joint according to claim 1, wherein the single pipe section includes a first single pipe connected to the another port of the first block and a second single pipe connected to the another port of the first block, the first single pipe and the second single pipe being connected each other to form the single pipe.

4. A fluid control device comprising:
   a plurality of gas lines, each of the gas lines including a plurality of fluid control apparatuses and joints on which the fluid control apparatuses are installed, wherein
   the joint including:
   a first block;
   a second block; and
   a single pipe section connecting the first block and the second block, wherein
   the joint has a first gas passage and a second gas passage inside the joint,
   the first gas passage is formed so that a first port which opens at an outer surface of the first block, the single pipe section, and a second port which opens at an outer surface of the second block communicate with each other,
   the second gas passage is formed so that a third port and a fourth port which open at the outer surface of the second block communicate with each other,
   the second port is disposed between the third port and the fourth port,
   the first gas passage includes a first passage formed on the first block and a second passage formed on the second block,
   the first passage includes the first port and an another port, the another port of the first passage opening at an another outer surface of the first block orthogonal to the outer surface at which the first port opens, the another port of the first passage being connected to the single pipe,
   the second passage includes the second port and an another port, the another port of the second passage opening at an another outer surface of the second block orthogonal to the outer surface at which the second port opens, the another port of the second passage being connected to the single pipe, and
   the outer surface of the first block and the outer surface of the second block face a same side, and the first port and the second port open on a same side.

5. The fluid control device according to claim 4, wherein
   the plurality of fluid control apparatuses include a first valve device which is a two-way valve device, a second valve device which is a three-way valve device, and a purge gas pipe configured to supply purge gas,
   the joint is arranged so that the first block is disposed on an upstream side of the second block,
   the first valve device is installed on the first block, and
   the second valve device and the purge gas pipe are installed on the second block.

6. The fluid control device according to claim 4, wherein
   the plurality of fluid control apparatuses include a valve device which is a three-way valve device, a purge gas pipe configured to supply purge gas, and a flow rate control apparatus,
   the joint is arranged so that the second block is disposed on an upstream side of the first block,
   the valve device and the purge gas pipe are installed on the second block, and
   the flow rate control apparatus is installed on the first block.

7. The fluid control device according to claim 4, wherein
   the first gas passage has a first passage formed in the first block and a second passage formed in the second block,
   the second passage includes a passage formed to be orthogonal to the outer surface of the second block, and
   the second gas passage is formed to keep out of the second passage.

8. The fluid control device according to claim 4, wherein the single pipe section includes a first single pipe connected to the another port of the first block and a second single pipe connected to the another port of the first block, the first single pipe and the second single pipe being connected each other to form the single pipe.

\* \* \* \* \*